(12) United States Patent
Shimabukuro (10) Patent No.: US 7,107,079 B2
(45) Date of Patent: Sep. 12, 2006

(54) CELLULAR PHONE SET

(75) Inventor: Moriaki Shimabukuro, Tokyo (JP)

(73) Assignee: NEC Corporation, Tokyo (JP)

( * ) Notice: Subject to any disclaimer, the term of this patent is extended or adjusted under 35 U.S.C. 154(b) by 207 days.

(21) Appl. No.: 10/278,357

(22) Filed: Oct. 23, 2002

(65) Prior Publication Data

US 2003/0092400 A1    May 15, 2003

(30) Foreign Application Priority Data

Oct. 31, 2001   (JP)   ............... 2001-335569

(51) Int. Cl.
*H04M 1/00*   (2006.01)

(52) U.S. Cl. ............... 455/566; 455/412.1; 455/575.1; 345/168

(58) Field of Classification Search ............ 455/575.1, 455/566, 412.1; 345/168; 463/40; 62/126; 709/206
See application file for complete search history.

(56) References Cited

U.S. PATENT DOCUMENTS

| | | | |
|---|---|---|---|
| 5,422,656 A | | 6/1995 | Allard et al. |
| 5,635,958 A | * | 6/1997 | Murai et al. ............... 345/168 |
| 6,487,424 B1 | * | 11/2002 | Kraft et al. ............... 455/566 |
| 6,908,389 B1 | * | 6/2005 | Puskala ............... 463/40 |
| 2001/0054291 A1 | * | 12/2001 | Roh et al. ............... 62/126 |

FOREIGN PATENT DOCUMENTS

| | | |
|---|---|---|
| EP | 0 982 910 A1 | 3/2000 |
| JP | 5-68078 | 3/1993 |
| JP | 11-168554 | 6/1999 |
| JP | 2000-242399 | 9/2000 |
| JP | 2000-278374 | 10/2000 |
| JP | 2001-128025 | 5/2001 |
| JP | 2002-358152 | 12/2002 |
| WO | WO 92/08285 | 5/1992 |
| WO | WO 01/71746 A1 | 9/2001 |

* cited by examiner

*Primary Examiner*—Jean Gelin
*Assistant Examiner*—Phuoc Doan
(74) *Attorney, Agent, or Firm*—Scully, Scott, Murphy & Presser, P.C.

(57) ABSTRACT

This invention is associated with a cellular phone set having a plurality of operation keys and one display device on a panel surface. This cellular phone set includes a touch sensor keyboard which can detect that a finger of a user touches each of the operation keys, a key analyzing section which generates a key event on the basis of the detection result from the keyboard, a screen control section which controls display of the screen on the basis of the key event, a screen display section which includes a display device such as an LCD which executes display under the control of the screen control section, and a memory which stores screen forming data. With this arrangement, display control on a function explanation corresponding to a key can be done in accordance with user operation.

7 Claims, 8 Drawing Sheets

| | TOUCH SENSOR KEY | |
|---|---|---|
| KEY ID | NUMBER UNIQUELY ASSIGNED TO EACH KEY | |
| FACTOR ID | KEY TOUCH | WHEN KEY IS TOUCHED |
| | KEY RELEASE | WHEN KEY IS RELEASED WITHOUT BEING PRESSED |
| | KEY DOWN | WHEN KEY IS PRESSED |
| | KEY UP | WHEN KEY IS RELEASED AFTER BEING PRESSED |

(STANDBY SCREEN)

"1ア" KEY IS TOUCHED

FIG.6B

"1ア" KEY IS PRESSED, BUT KEY IS NOT RELEASED

FIG.6C

FINGER IS MOVED AWAY FROM "1ア" KEY AND TALK KEY IS TOUCHED

FIG.6D

FINGER IS MOVED AWAY FROM TALK KEY AFTER IT'S PRESSED

FIG.6E

FIG.7A
(CHARACTER INPUT SCREEN)

"2カ" KEY IS TOUCHED

FIG.7B

"2カ" KEY IS PRESSED, BUT KEY IS NOT RELEASED

FIG.7C

"2カ" KEY IS PRESSED, BUT KEY IS NOT RELEASED

FIG.7D

"4タ" KEY IS TOUCHED

FIG.7E

"4タ" KEY IS PRESSED, BUT KEY IS NOT RELEASED

FIG.7F

FIG.8A
(MENU SCREEN)

MENU KEY IS PRESSED

FIG.8B

"4タ" KEY IS TOUCHED

FIG.8C

"1ア" KEY IS TOUCHED

| | | TOUCH SENSOR KEY(1ST EMBODIMENT) | TWO-STROKE PRESS KEY(2ND EMBODIMENT) |
|---|---|---|---|
| KEY ID | | NUMBER UNIQUELY ASSIGNED TO EACH KEY | NUMBER UNIQUELY ASSIGNED TO EACH KEY |
| FACTOR ID | KEY TOUCH | WHEN KEY IS TOUCHED | WHEN KEY IS PRESSED TO FIRST STROKE |
| | KEY RELEASE | WHEN KEY IS RELEASED WITHOUT BEING PRESSED | WHEN KEY IS RELEASED AFTER BEING PRESSED TO FIRST STROKE |
| | KEY DOWN | WHEN KEY IS PRESSED | WHEN KEY IS PRESSED TO SECOND STROKE |
| | KEY UP | WHEN KEY IS RELEASED AFTER BEING PRESSED | WHEN KEY IS RELEASED AFTER BEING PRESSED TO SECOND STROKE |

CELLULAR PHONE SET

BACKGROUND OF THE INVENTION

1. Field of the Invention

The present invention relates to a cellular phone set which facilitates key operation and, more particularly, to a cellular phone set which can perform display control on a function explanation according to each key in accordance with user operation.

2. Description of the Prior Art

In a conventional cellular phone set, a plurality of functions are assigned to one key as the phone set becomes multifunctional. In order to prevent a user from becoming confused about operation, it is preferable to make proper function explanations. For this purpose, function explanations by means of popup windows are prepared. More specifically, the user displays icons associated with functions and a cursor frame for the selection of an icon on the screen of a display window. The user then moves the cursor frame to an icon corresponding to a function for which a function explanation is to be displayed by using the cursor key, thereby displaying the function explanation.

The following problems arise in the above conventional technique.

The first problem is that special operation is required to display a function explanation.

This is because the function of displaying function explanations must be limited due to the limitation of the amount of information that can be displayed on the screen, and hence the user needs to perform operation for the selection of a function.

The second problem is that a function explanation cannot be displayed depending on the input screen.

This is because user operation for the selection of a function for which a function explanation is to be made contends with user operation on a currently displayed screen in some cases.

SUMMARY OF THE INVENTION

The present invention has been made to solve the above problems in the prior art, and has as its object to provide a new cellular phone set which can display a function explanation corresponding to each operation key at a proper timing while allowing a user to operate keys in a conventional manner.

In order to achieve the above object, according to the first aspect of the present invention, there is provided a cellular phone set having a plurality of operation keys and one display device on a panel surface, comprising:

first control means for detecting a state wherein a finger touches the key and controlling display of the cellular phone set in a first state on the basis of the detected state;

second control means for detecting a state wherein the finger is moved away from the key and controlling display of the cellular phone set in a second state on the basis of the detected state;

third control means for detecting a state wherein the key is pressed after the finger touched the key and controlling display of the cellular phone set in a third state on the basis of the detected state; and fourth control means for detecting a state wherein the finger is moved away from the key after the key was pressed and controlling display of the cellular phone set in a fourth state on the basis of the detected state.

According to the second aspect of the present invention, the first control means in the first aspect controls to display a function explanation corresponding to the operation key on the display device and make indications displayed on the display device on the basis of the second, third, and fourth control means differ from an indication displayed on the basis of the first control means.

According to the third and fourth aspects of the present invention, each of the plurality of operation keys is a touch sensor key or two-stroke press key.

As described above, according to the present invention, since a plurality of touch sensor keys or similar keys are used for a keyboard, each key which the user intends to press can be detected, and an explanation of a function associated with the key is displayed on a popup window before it is pressed. In this manners display control on a function explanation corresponding to each key can be done in accordance with user operation.

As is obvious from the respective aspects, the cellular phone set according to the present invention has the following effects.

First, since the cellular phone set is designed to display an explanation of a function associated with a key which the user intends to operate immediately before the operation, operation errors caused by the user can be reduced.

Second, since the cellular phone set is designed such that a key which the user intends to operate is detected by a touch sensor, and an explanation of a function associated with the key is automatically displayed, the user can refer to the explanation of the function without performing any special operation.

The above and many other objects, features and advantages of the present invention will become manifest to those skilled in the art upon making reference to the following detailed description and accompanying drawings in which preferred embodiments incorporating the principle of the present invention are shown by way of illustrative examples.

DETAILED DESCRIPTION OF THE PREFERRED EMBODIMENTS

Cellular phones according to several preferred embodiments of the present invention will be described in detail below with reference to the accompanying drawings.

First Embodiment

Figure 1:
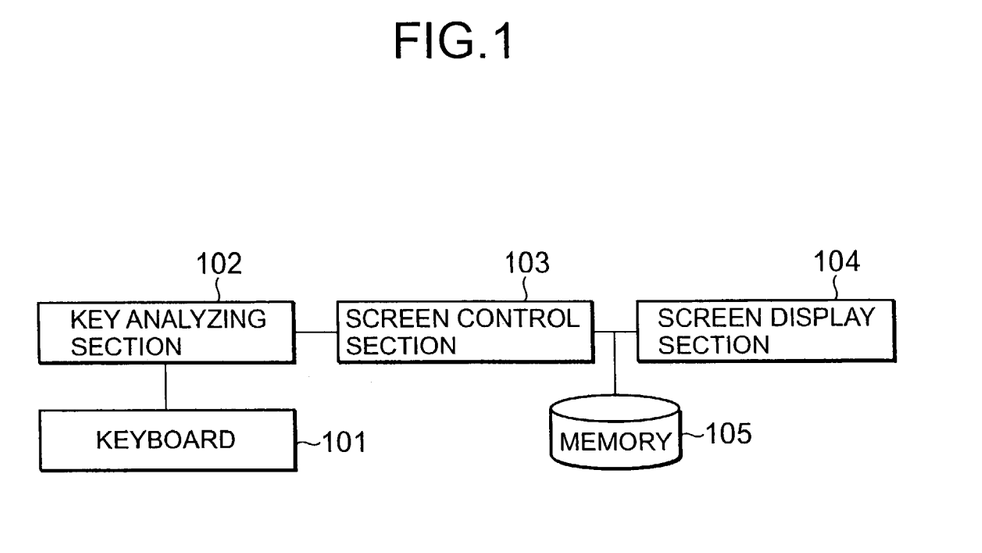
FIG. 1 is a block diagram showing the arrangement of a cellular phone set according to the present invention.

Referring to FIG. 1, a cellular phone set according to the present invention is comprised of a keyboard 101 having a plurality of touch sensor keys each of which can detect the touch of a finger of a user, a key analyzing section 102 for generating a key event on the basis of the detection result from the keyboard 101, a screen control section 103 for controlling the display of a screen on the basis of a key event, a screen display section 104 which includes a display device such as an LCD and executes display under the control of the screen control section 103, and a memory 105 which stores data that forms a screen.

As is obvious from FIG. 1, the cellular phone set according to the present invention has the keyboard 101 having a plurality of touch sensor keys. When the touch sensor of each key of the keyboard 101 detects the touch of a user's finger on the key, the key analyzing section 102 generates a predefined key event in accordance with the detection result. The screen control section 103 controls to display a function explanation corresponding to the key touched by the user on a popup window 202. The screen display section 104 displays display data from the memory 105 on the popup window 202 on a screen 201 on the basis of this control. When the user moves his/her finger off the key, this action is detected, and the popup window 202 disappears. In this manner, display control on function explanations can be done in accordance with user operation.

The above operation in each section will be described next.

The key analyzing section 102 generates a key event on the basis of a detection result from the keyboard 101.

The screen control section 103 instructs the screen display section 104 to display or not to display a popup window in accordance with the generated key event.

The screen display section 104 forms a display screen by using screen forming data stored in the memory 105 in advance and displays it on a display screen formed by an LCD or the like.

Figure 2:
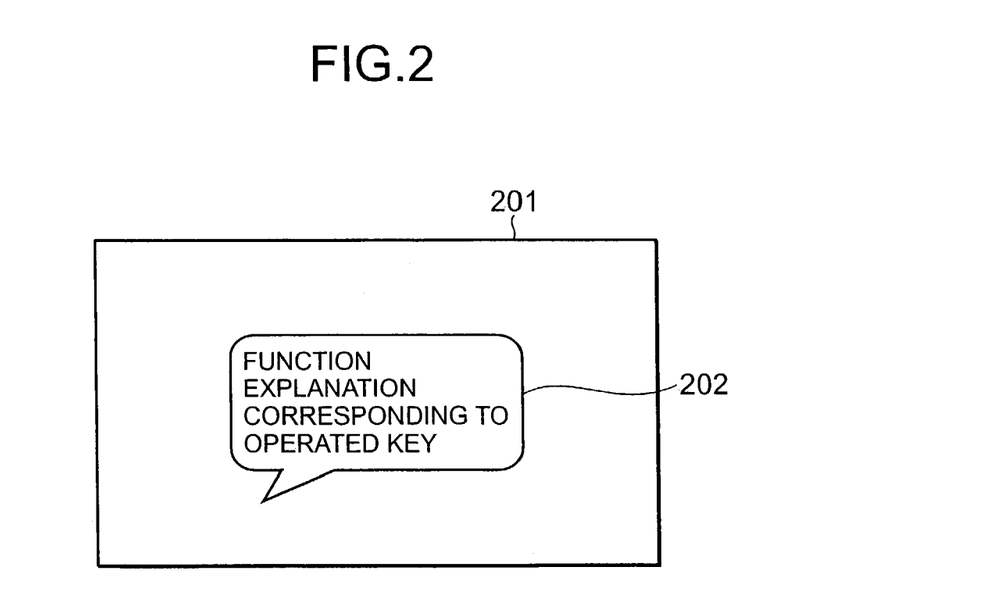
FIG. 2 is a view showing a display example on the display screen of the cellular phone set according to the present invention.

FIG. 2 shows a display example of the popup window 202 on the screen 201 of the screen display section 104.

Figure 3:
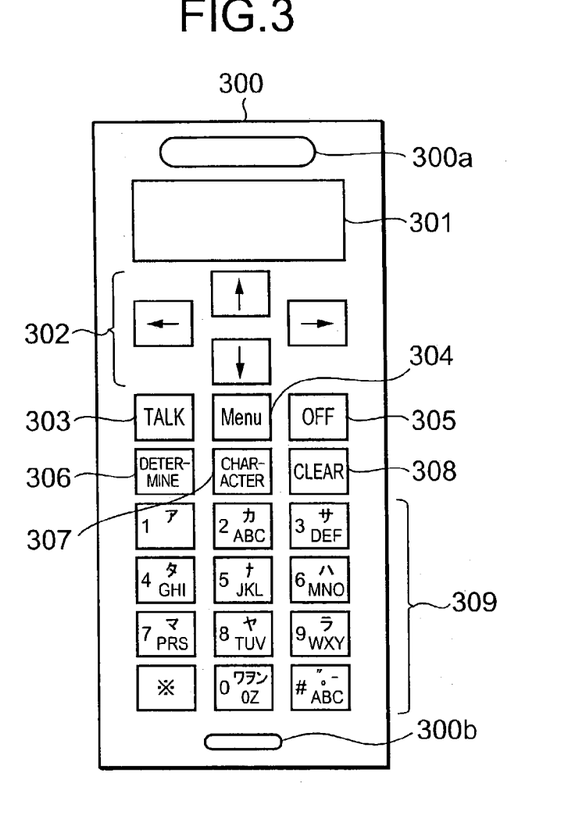
FIG. 3 is a plan view showing a key arrangement example on the panel surface of the cellular phone set according to the present invention.

FIG. 3 shows an arrangement of the respective portions on the panel surface of the cellular phone set according to the present invention.

Referring to FIG. 3, reference numeral 300 denotes a cellular phone set; 300a and 300b, a receiver and a transmitter; 301, a display screen formed by an LCD or the like; 302, a cursor key; 303 to 308, function selection keys; and 309, ten keys and the like.

The overall operation of the first embodiment will be described in detail next with reference to FIGS. 1, 4, and 5.

Figure 4:
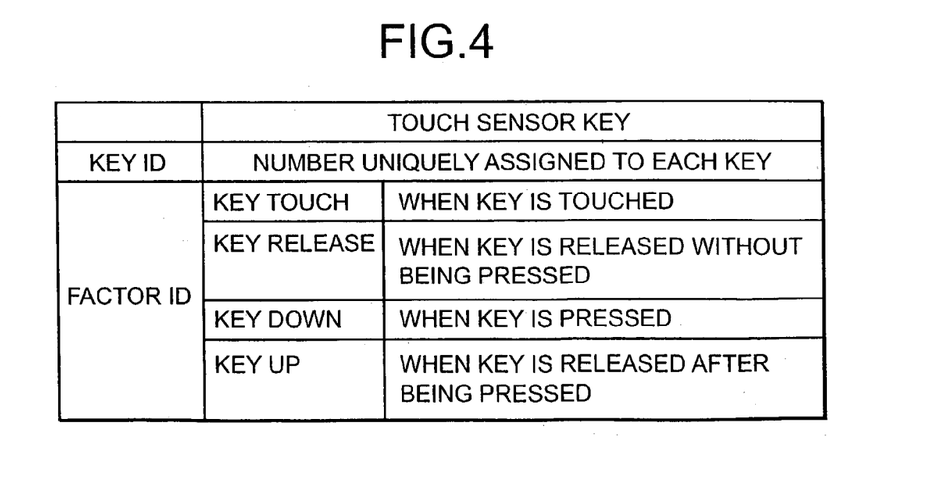
FIG. 4 is a table showing the operation state of an operation key in the first embodiment of the present invention.
Figure 5:
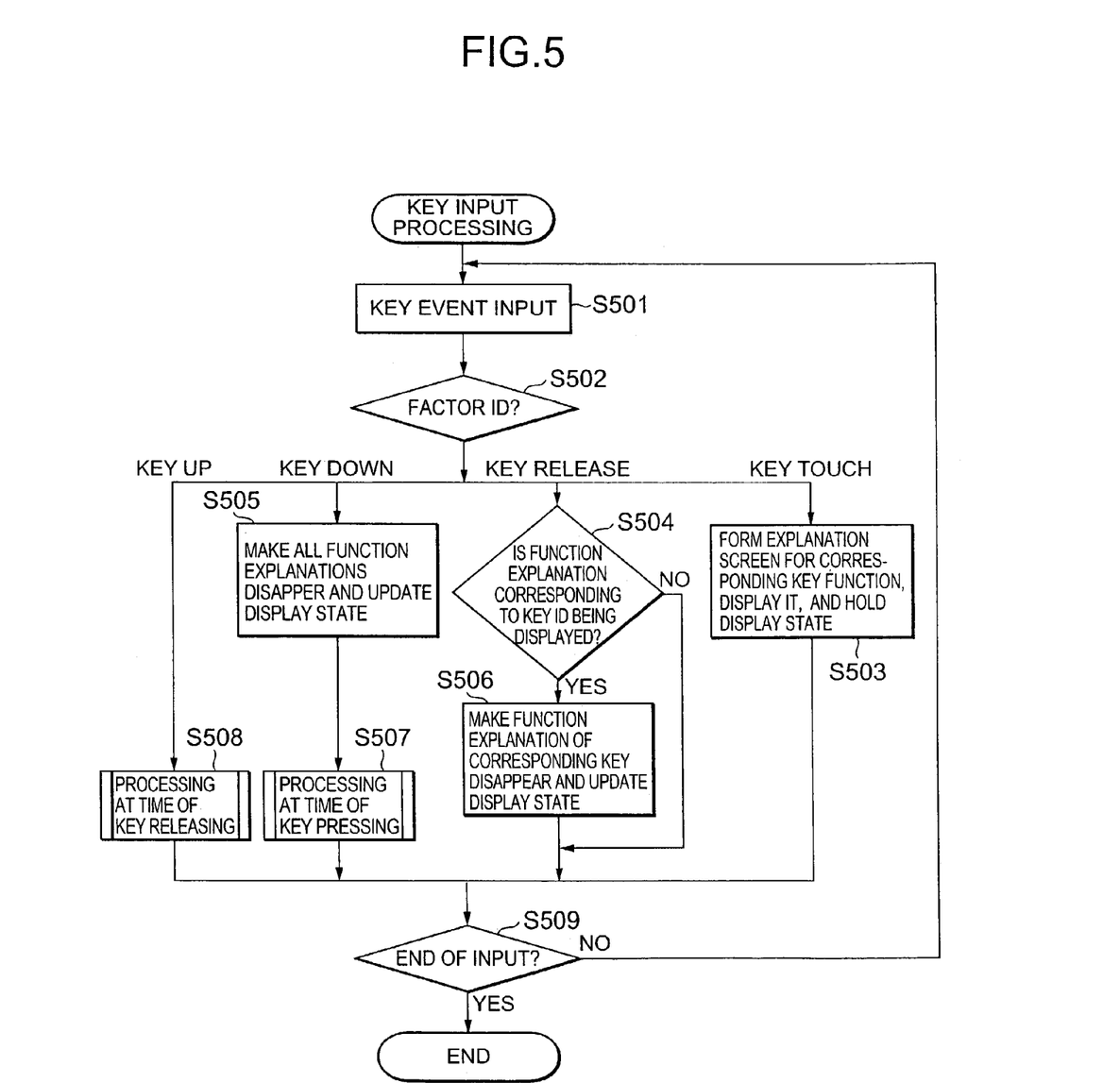
FIG. 5 is a flow chart showing the operation of the first embodiment of the present invention.

When one key is operated by the user, the key analyzing section 102 generates a key event constituted by a predefined key ID and factor ID shown in FIG. 4 on the basis of the key operation (step S501). The control branches to corresponding processing for each factor ID in accordance with the generated key event (step S502).

Subsequently, processing for each factor ID is performed after branching (steps S503 to S508).

It is finally checked whether the input operation is terminated, and the flow waits for the next key input if necessary (step S509).

Processing for each factor ID will be described next.

When the factor ID is Key_Touch (a state wherein the key is touched), a function explanation corresponding to the key is displayed on the display screen 201 in accordance with the key ID of the key event, and the display state of the function explanation corresponding to the key is stored in the memory 105. With this operation, the popup window 202 is displayed on the display screen 201 (step S503).

When the factor ID is Key_Release (a state wherein the key is released without being pressed), if the function explanation is displayed on the display screen 201, the function explanation is made to disappear in accordance with the display state stored in the memory 105 (step S504), and the display state of the function explanation corresponding to the key in the memory 105 is updated.

When the factor ID is Key_Down (a state wherein the key is pressed), all function explanations that are being displayed disappear, and at the same time, the display is updated to display the function explanation corresponding to the pressed state of the key (step S505). Subsequently, a function associated as processing at the time of key pressing with the key is executed as processing at the time of key pressing (step S507).

When the factor ID is Key_Up (a state wherein the key is released after it is pressed), processing at the time of key releasing is executed (step S508).

The first operation example in the first embodiment of the present invention in a case wherein abbreviated dialing is to be performed from a standby screen as shown in FIGS. 6A to 6E will be described next by using a display screen (LCD).

Figures 6A, 6B:
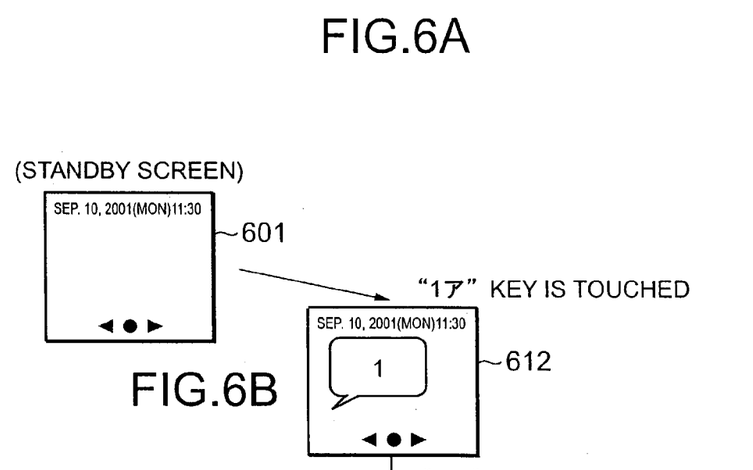
FIGS. 6A to 6E are views for explaining the first operation example of the cellular phone set according to the present invention in detail by using a display screen.
Figure 6C:
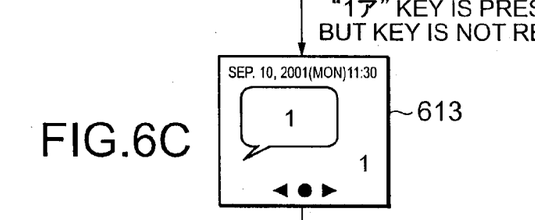
Figure 6D:
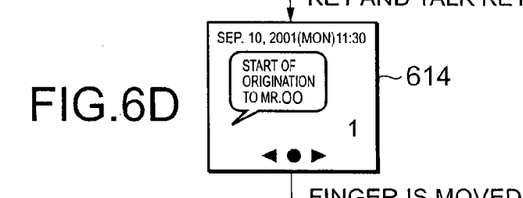
Figure 6E:
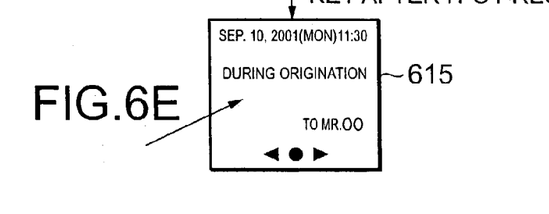
Figure 7A:
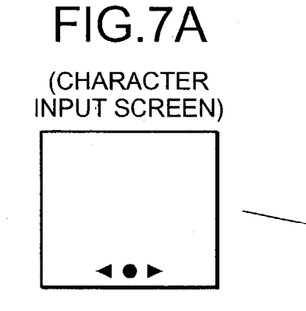
FIGS. 7A to 7F are views for explaining the second operation example of the cellular phone set according to the present invention in detail by using a display screen.
Figure 7B:
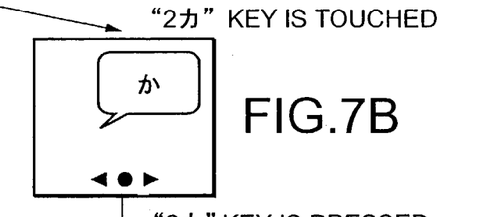
Figure 7C:
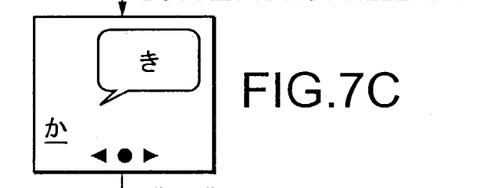
Figure 7D:
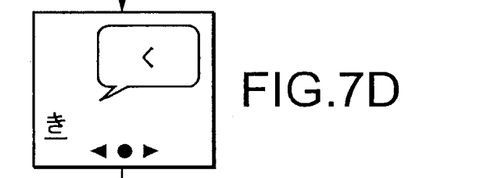
Figure 7E:
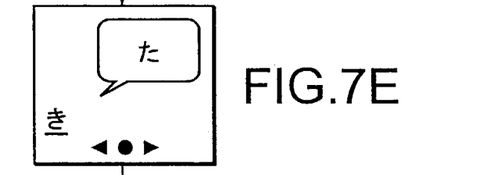
Figure 7F:
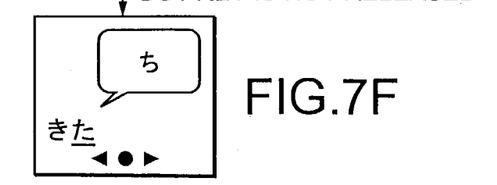
Figure 8A:
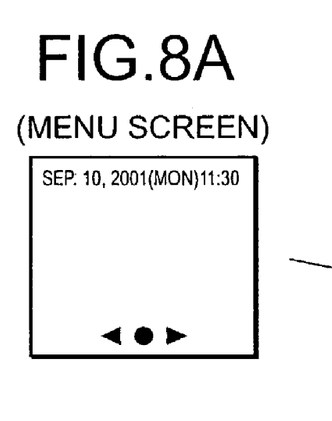
FIGS. 8A to 8D are views for explaining the third operation example of the cellular phone set according to the present invention in detail by using a display screen.
Figure 8B:
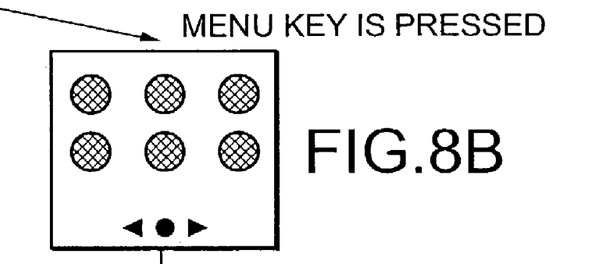
Figure 8C:
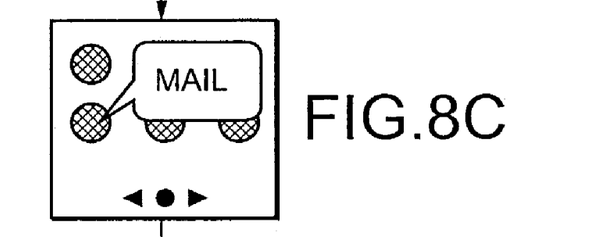
Figure 8D:
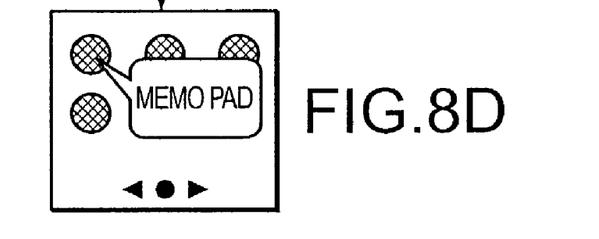

First of all, the flow waits for key input done by the user while the standby screen is displayed (a screen 601 in FIG. 6A).

If the user touches the "1 (ア)" key, the keyboard 101 detects that the user touched the key, and the key analyzing section 102 then generates a key event (step S501). Assume that at this time, a key ID is defined by a unique value representing the "1 (ア)" key. The factor ID becomes Key_Touch, and the screen control section 103 instructs the screen display section 104 to display a function explanation corresponding to the key in accordance with the factor ID of the generated key event. The screen display section 104 forms a function explanation screen corresponding to the "1 (ア)" key from screen forming data corresponding to the "1 (ア)" key on the standby screen which is stored in the memory 105, and displays the screen on the LCD. The screen display section 104 also stores this display state in the memory 105. In this case, a function explanation having contents explaining that "1 (ア)" is input is displayed on the popup window 202 (step S503; a screen 612 in FIG. 6B). Since the input operation is not terminated, the flow waits for the next key operation (step S509).

If the user presses the "1 (ア)" key, pressing of the "1 (ア)" key is detected, and the key analyzing section 102 generates a key event having a key ID corresponding to the "1 (ア)" key and a factor ID corresponding to Key_Down (step S501) The screen control section 103 checks the factor ID of the generated key event (step S502). The screen control section 103 then instructs the screen display section 104 to stop displaying all currently displayed function explanations and update the display state of all the function explanations (step S505). Subsequently, predetermined processing corresponding to the "1 (ア)" key, which is defined separately, is performed. In this case, the processing of inputting "1 (ア)" is executed (step S507; a screen 613 in FIG. 6C). Since the input operation is not terminated, the flow waits for the next key input (step S509).

Assume that the user then takes his/her finger off the "1 (ア)" key. At this time, the keyboard 101 detects that the user has taken his/her finger off the "1 (ア)" key, and the key analyzing section 102 generates a key event having a key ID corresponding to the "1 (ア)" key and a factor ID corresponding to Key_Up (step S501).

Subsequently, the screen control section 103 checks the factor ID of the generated key event (step S502). The screen control section 103 performs processing to be performed when the user takes his/her finger off the "1 (ア)" key after pressing it, which is defined separately. In this case, no special processing is executed (step S508; the screen 613 in FIG. 6C). The flow waits for the next key input again (step S509).

Assume that the user touches the "talk" key 303 afterward. Upon detection of this action, the key analyzing section 102 generates a key event having a key ID corresponding to the "talk" key and a factor ID corresponding to Key_Touch (step S501). The screen control section 103 instructs the screen display section 104 to display a function explanation on the basis of the factor ID of the generated key event (step S502). The screen display section 104 forms a function explanation screen corresponding to the "talk" key 303 from screen forming data corresponding to the "talk" key 303 on the standby screen which is stored in the memory 105 in advance, and displays it on the LCD. The screen display section 104 also stores this display state in the memory 105. In this case, a function explanation having contents explaining that the number registered to abbreviated dial 1 is displayed on the LCD (step S503; a screen 614 in FIG. 6D). In this case as well, since the input operation is not terminated, the flow waits for the next key input (step S509).

If the user pressed the "talk" key 303, the keyboard 101 detects pressing of the "talk" key 303, and the key analyzing section 102 generates a key event having a key ID corresponding to the "talk" key and a factor ID corresponding to Key_Down (step S501). The screen control section 103 checks the factor ID of the generated key event (step S502). The screen control section 103 then instructs the screen display section 104 to stop displaying all currently displayed function explanations and update the display state by displaying a function explanation at the time of key pressing on the LCD (step S505). Subsequently, processing to be done when the "talk" key 303 is pressed, which is defined separately, is done. In this case, origination processing is executed. Since the input number is 1, origination is executed (step S507). The flow then waits for the next key input again (step S509 in FIG. 5).

When it is detected that the user has taken his/her finger off the "talk" key 303, the key analyzing section 102 generates a key event having a key ID corresponding to the "talk" key and a factor ID corresponding to Key_Up (step S501). The screen control section 103 performs processing to be done when the user takes his/her finger off the "talk" key 303, which is defined separately, on the basis of this key event. In this case, the processing of indicating that origination is being done is executed. A screen indicating that "origination" is being done to the number registered to abbreviated dial 1 is displayed on the LCD (step S508; a screen 615 in FIG. 6E).

Assume that key events corresponding to a single key occur consecutively in a short period of time. In this case, a screen formed at the time of processing the last key event is used as a display screen. Therefore, rendering processing may be optimized by skipping screen update processing in processing the remaining key events during this period.

Figure 9A:
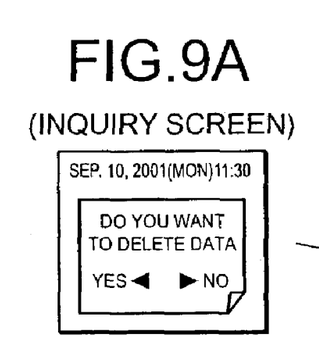
FIGS. 9A to 9C are views for explaining the fourth operation example of the cellular phone set according to the present invention in detail by using a display screen.
Figure 9B:
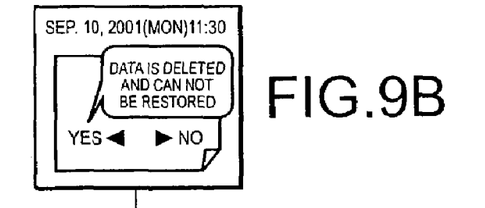
Figure 9C:
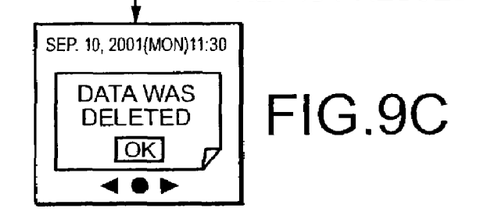

Note that the cellular phone set according to the present invention may be used for character input operation shown in FIGS. 7A to 7F, menu selection on a menu screen shown in FIGS. 8A to 8D, data processing shown in FIGS. 9A to 9C, and the like.

Second Embodiment

The second embodiment of the present invention will be described in detail next with reference to FIG. 10.

Figure 10:
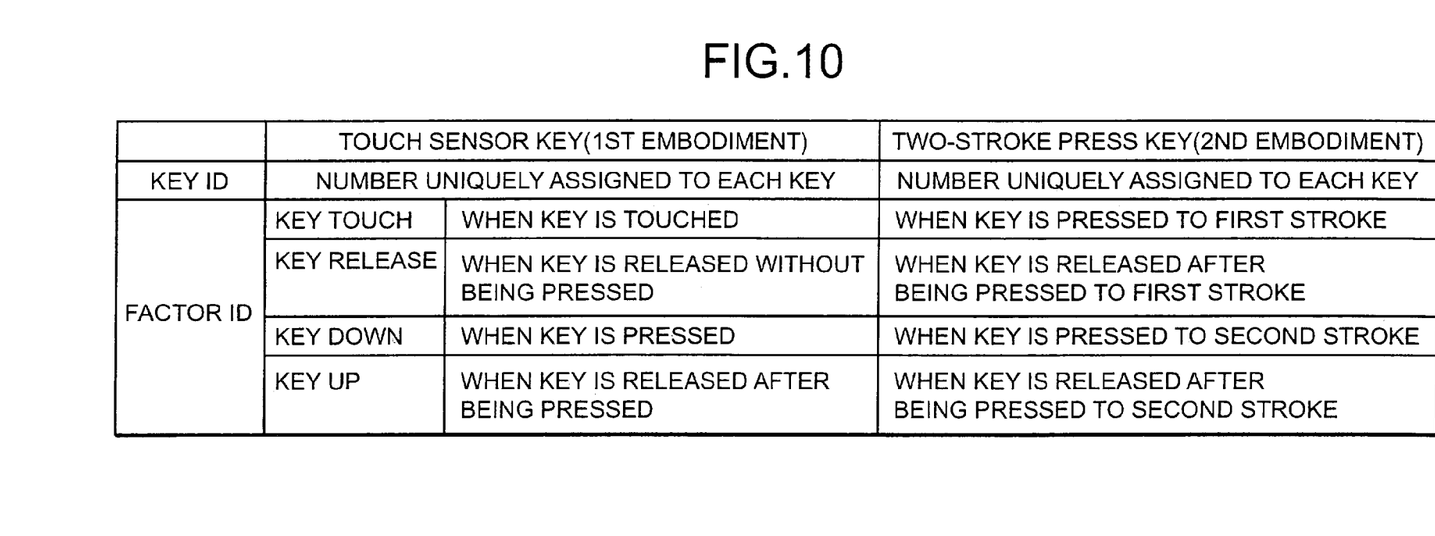
FIG. 10 is a table showing the operation state of an operation key according to the second embodiment of the present invention.

As is obvious from FIG. 10, the second embodiment of the present invention uses an arrangement in which the respective keys of the keyboard 101 are changed from touch sensor keys to two-stroke press keys that can be pressed in two strokes. The arrangement of this embodiment is the same as that of the first embodiment except for this.

By changing the assignment of events to be generated by a key analyzing section 102 into the "two-stroke press key" array in FIG. 10, the same effects as those obtained in the case of the touch sensor keyboard in the first embodiment can be obtained.

What is claimed is:

1. A cellular phone set having a plurality of operation keys and one display device on a panel surface, comprising:

first control means for detecting a state wherein a finger touches at least one of said plurality of operation keys and controlling display of said cellular phone set in a first state on the basis of the detected state, said first control means instructs a screen display section to display a function explanation corresponding to each touched operation key;

second control means for detecting a state wherein the finger is moved away from the key and controlling display of said cellular phone set in a second state on the basis of the detected state;

third control means for detecting a state wherein the key is pressed after the finger touched the key and controlling display of said cellular phone set in a third state on the basis of the detected state, in the third state, said third control means instructs a screen display section to stop displaying all currently displayed function explanations and updates a display state by displaying only the function explanation that corresponds to the touched key; and fourth control means for detecting a state wherein the finger is moved away from the key after the key was pressed and controlling display of said cellular phone set in a fourth state on the basis of the detected state.

2. A phone set according to claim 1, wherein said first control means make indications displayed on the display device on the basis of said second, third, and fourth control means differ from an indication displayed on the basis of said first control means.

3. A cell phone according to claim 2 wherein the function explanation corresponding to the operation key is displayed on a popup screen on said display device.

4. A phone set according to claim 1 or 2, wherein each of the plurality of operation keys is a touch sensor key.

5. A phone set according to claim 1 or 2, wherein each of the plurality of operation keys is a two-stroke press key.

6. A cellular phone set having a plurality of operation keys and one display device on a panel surface, comprising:
- a touch sensor keyboard which can detect that a finger of a user touches each of the operation keys;
- a key analyzing section which generates a key event on the basis of a detection result from said keyboard;
- a screen control section which controls display of a screen on the basis of the key event;
- a screen display section which includes a display device which executes display under the control of said screen control section; and
- a memory which stores, in advance, screen forming data, and stores a display state of the executed display under the control of said screen control section, said screen forming data includes instructions for displaying a function explanation corresponding to each touched operation keys when a finger touches at least one of said operation keys and instructions for stopping displaying all currently displayed function explanations when at least one of said operation keys is depressed and instructions for displaying only the function explanation that corresponds to said at least one depressed key.

7. A phone set according to claim 6, wherein when the key events corresponding to a single key consecutively occur in a short period of time, a screen formed when the last key event is processed becomes a display screen, and screen update processing in processing the remaining key events during the period is not executed.

* * * * *